Figure 2:
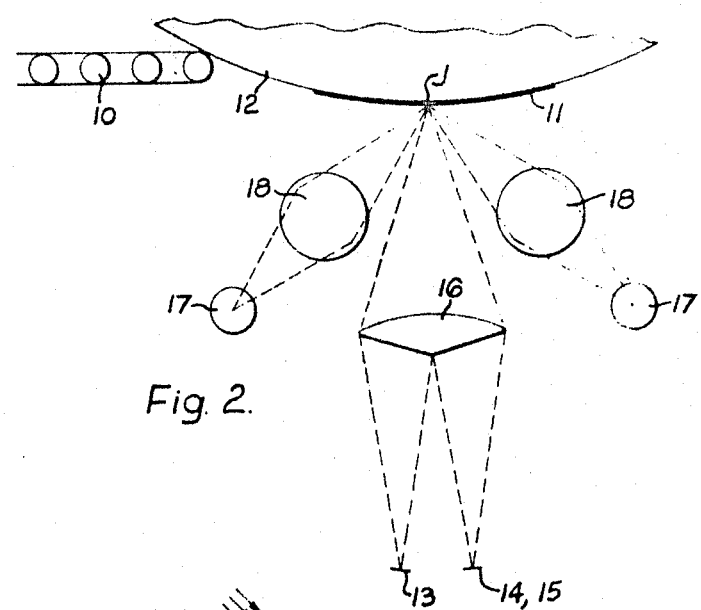

United States Patent

[11] 3,596,062

| [72] | Inventors | Leslie John Street<br>Bristol;<br>John Francis Cowles, Winterbourne, both of, England |
| --- | --- | --- |
| [21] | Appl. No. | 769,076 |
| [22] | Filed | Oct. 21, 1968 |
| [45] | Patented | July 27, 1971 |
| [73] | Assignee | Parnall & Sons, Limited<br>Birmingham, England |

[54] METHOD AND APPARATUS FOR DOCUMENT READING
17 Claims, 5 Drawing Figs.

[52] U.S. Cl. .................................................. 235/61.11E,
250/219 Q
[51] Int. Cl. ................................................... G06k 7/00,
G01n 21/30

[50] Field of Search ...................................... 235/61.115,
61.11; 250/219 ID, 219 DC; 35/48

[56] References Cited
UNITED STATES PATENTS

| 2,196,166 | 5/1940 | Bryce | 250/219 X |
| --- | --- | --- | --- |
| 3,176,141 | 3/1965 | Siegemund | 250/219 |
| 3,437,793 | 5/1969 | Van Berkel et al. | 250/219 |

*Primary Examiner*—Daryl W. Cook
*Attorney*—Norris & Bateman

ABSTRACT: A method and apparatus for automatic reading of single-color printed documents bearing manually entered information in another color wherein transducer means is alternately conditioned in reading the document to provide an output representative of only information in the print color and subsequently or previously another output representative of only information in the other color.

Fig. 1.

SHEET 2 OF 3

INVENTORS
LESLIE JOHN STREET
JOHN FRANCIS COWLES

PATENTED JUL 27 1971

3,596,062

SHEET 3 OF 3

INVENTORS
LESLIE JOHN STREET
JOHN FRANCIS COWLES

BY Davies & Bateman

METHOD AND APPARATUS FOR DOCUMENT READING

This invention relates to a novel method and apparatus for automatic document reading.

It is conventional practice to point guidelines and the like on documents (such as, for example, football pool coupons and goods order sheets) in a first color, for example red, different from the color of the variable information to be subsequently manually entered on the document for automatic reading, to design the information-reading transducers so that they are relatively insensitive to this printed color as compared with their response to the color of the information entries, and to preprint other information on the document in a second color different from the first-mentioned print color so that this latter information can be read automatically by the same information transducers as read the entered information. The disadvantage of this practice is the higher cost of the two-color printing as compared with single-color printing, and the risk of offset and otherwise-produced marks of the second color appearing in the areas defined by the first color with the accompanying risk of these marks being read as information marks.

The present invention has for its object the provision of a method and apparatus for automatic reading both preprinted and subsequently entered information on documents printed in a single color.

The invention consists of a method of automatic document reading comprising transporting a document along a fixed path while scanning the document by transducer means responsive to both printed and manually entered information on the document, characterized in that the transducer means 13,15,30 is alternately conditioned to provide an electrical output representative of only information L in a single print color of the document 11 and subsequently or previously to provide an electrical output representative of only information G of a different color to that of the document print.

Apparatus for automatic document reading according to the invention comprising means for transporting a document along a fixed path and transducer means for scanning the document in said path to respond to light bearing document information and provide an electrical output representative of both printed and manually entered document information, characterized in that the transducer means 13,15,30 is alternately responsive to provide an electrical output representative of only the printed information L in the single pring color of the document 11 and subsequently or previously to provide an electrical output representative of only the manually entered information G in a different color to that of the document print, and control means 14,19,33 for determining the alternate conditioning of said transducer means.

The invention comprehends for example the use of image splitting in relation to two separate groups of read cells wherein one group is responsive to an image of or including a given color and the other group is responsive to an image of a color other than the given color, and wherein the switching means determines the alternative utilization of the responses of the two groups of cells. Alternatively, for example, the invention comprehends the use of filters which can be physically displaced in relation to a single group of read cells to vary the color response of these cells.

Figure 3:
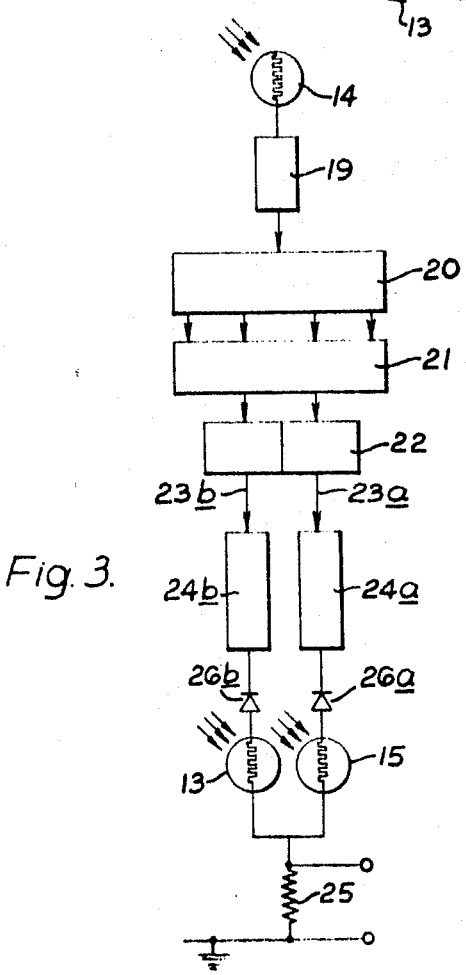
Figure 4:
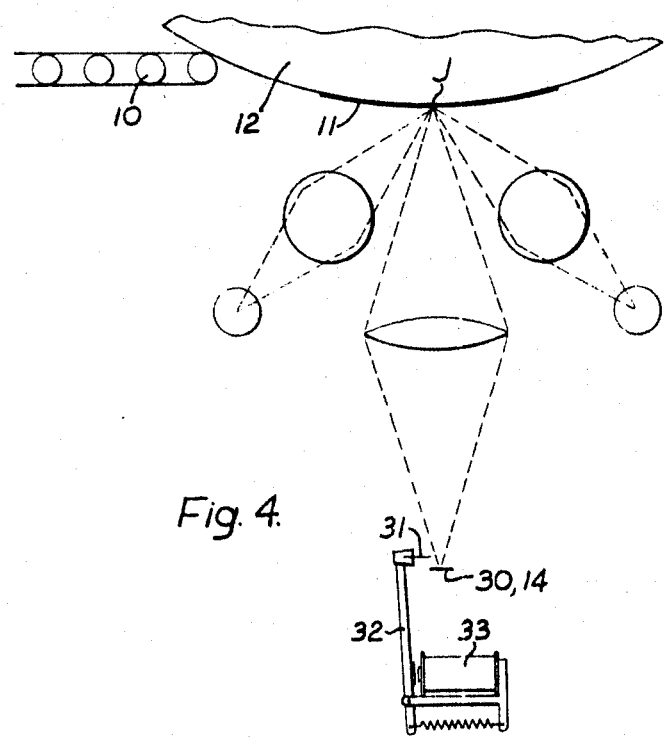
Figure 5:
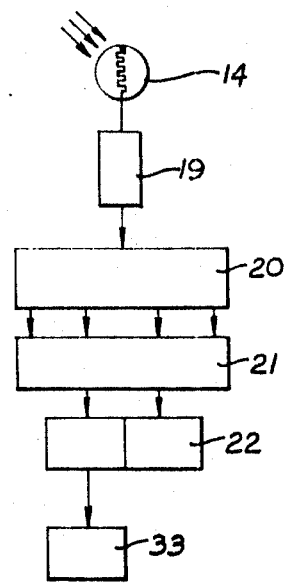

The practical realization of the two last-mentioned examples of the invention as applied to the automatic reading of documents printed only in red ink are described with reference to the accompanying drawings wherein:

FIG. 1 illustrates a typical document of the kind read by the method and apparatus of the invention, FIG. 2 schematically illustrates the optical reading systems of the first example of the invention, FIG. 3 schematically illustrates the electrical control system associated with the example of FIG. 2, FIG. 4 schematically illustrates the optical reading system of the second example of the invention, and FIG. 5 schematically illustrates the electrical control system associated with the example of FIG. 4.

Referring to FIG. 1 the document comprises a first area X bounded by the red printlines A, B, C and D which is subdivided in grid fashion into a plurality of zones E by red printed guides F intended to contain the manually entered and automatically read information marks, as exemplified at G made in nonred color (for example by black or blue writing implements or pencil by the document user) as appropriate to the visually read item legends of the transverse lines J and the quantity columns. Automatically read instruction marks, for example synchronization marks I, are printed in red on the right-hand side of line D one mark in register with each of the transverse information entry lines J. Above the line A in heading area K the document has red printed and automatically read information L appropriate, for example, to a batch of documents. To initiate automatic reading of the document a red printed mark is provided at M.

Referring to FIG. 2, the apparatus comprises transporting means 10 for directing documents 11 in spaced-apart sequence on to a vacuum drum 12 whereon their heading areas K and areas X are sequentially scanned by information transducers in the form of a group of photoconductive cells 13 of low change of output to light from red print so that this particular group of cells necessarily responds to and electrically represent any information in the form of light reflected from manually entered nonred markings of the kind shown at G in FIG. 1 as each information line J extending transverse to the path of movement of the document is presented in register with the cells. Another transducer 14, referred to as the clock track read cell, of relatively high change of output to light from red print is arranged to respond to the red printed instruction marks to initiate the reading of each line of information J on the document as these are scanned by transducers 13. A second group of transducers 15 constituted by photoconductive cells of high change of output to light from red print respond to information in the form of light reflected from the red printed information markings L in the heading area K of the document as the relevant lines are sensed by the transducer 14.

The nonred and red-reading groups of transducers 13,15, the latter together with the red-reading transducer 14, are respectively positioned at the two foci of a beam-splitting lens 16 constituted by either a combined or separate prism and cylindrical or spherical lens projection system receiving light reflected normally from an information line J of the document illuminated from a pair of light sources 17 and condenser lenses 18 positioned at equal angles on either side of the reflected light beam. The alternative utilization of the two groups of transducers 13,15 is under the control of the transducer 14 and logical circuitry illustrated in FIG. 3.

Referring to FIG. 3, the pulse output of the clock track read cell 14 is amplified at 19 and fed to a counting circuit 20. Predetermined counts of circuit 20 are recognized by a count selector circuit 21 to control a store 22 constituted by a bistable flip-flop. At these predetermined counts the latter reverses the states of its output 23a and 23b respectively controlling power supplies 24a and 24b. During a first count following recognition of the presence of a document by sensing of the mark M by cell 14 the lines (one in the document of FIG. 1) of the document heading area K are scanned by both groups of cells 13 and 15 but only one power supply 24a is operative to activate transducers group 15 so as to produce an output across resistor 25 indicative only of the red printed information in this area. At the same time the power supply 24b is inoperative and leaves transducers group 13 inactive due to its isolation by its respective diode 26b so that no output is provided from any marks scanned by the nonred mark-reading transducer group 13. When a predetermined count is sensed by circuit 21 corresponding with the completion of scanning of all of the lines of red printed marks in area K, the store 22 reverses the states of its outputs 23a, 23b so as to deactivate transducers group 15 due to the inoperative condition of its power supply 24a and isolation by diode 26a while transducers group 13 is now activated by its operative power supply 24b. In this condition transducer group 13 provide an output across resistor 25 corresponding with the manually entered nonred marks G as each line J is scanned, while no response is derived from any red printed marks sensed by transducer group 15. After a predetermined further count is attained corresponding with the number of lines J the store 22 again reverses its output to await commencement of reading of the next document. The processing of the information provided across the resistor 25 follows conventional practice and forms no part of this invention.

Since it can be readily arranged that the red printed information is bold the risk of misreading extraneous markings can be ignored.

The second example of the invention illustrated in FIG. 4, again intended for processing the single-color printed document illustrated in FIG. 1, the two separate groups of transducers 13 and 15 of the first example are now replaced by a single group of red-sensitive transducers 30 positioned at the focus of a conventional light projection system, and the alternative response of the transducers 30 to manually entered nonred and red printed input information is controlled by a filter 31 which is moveable into and out of the path of light between the document 11 and the transducers. In this example, the filter 31 is mounted on the moveable armature 32 of an electromagnetic relay 33, so that change of current through the relay serves to displace the filter and thereby determine the type of response of the transducers 30.

The synchronization of automatic reading of the document and the displacement of the filter 31 to control the color response of the transducers 30 is again controlled by a rereading clock track read cell 14 responsive to the marks M and I of the document. This control is achieved by the circuit of FIG. 5 which corresponds with that of FIG. 3 excepting that the control store 22 now serves to effect displacement of the armature 32 of the relay in opposite directions in the alternative states of one of its outputs.

What we claim is:

1. In a method of automatically reading a document bearing information printed in one color and containing information entered in a different color, the steps of scanning the document by transducer means that is responsive to both of said colors and alternately conditioning said transducer means to provide separate electrical outputs representative respectively of response to only of one or the other of said colors.

2. In the method defined in claim 1, the output representing response of said transducer means to said one color being subsequent to the output representing response of said transducer means to said entered color.

3. In the method defined in claim 1, the output representing response of said transducer means to said one color being previous to the output representing response of said transducer means to said entered color.

4. In the method defined in claim 1, said entered color being manually entered on a document having information previously printed in said on color.

5. In the method defined in claim 1, the step of transporting said document along a fixed path during scanning.

6. In the method defined in claim 1, there being colored instruction marks provided on said document and said alternate conditioning being effected in response to sensing of said instruction marks by said transducer means.

7. In the method defined in claim 6, said instruction marks being printed in said one color.

8. In the method defined in claim 7, said sensing comprising counting of said instruction marks in said transducer means.

9. In the method defined in claim 1, the steps of splitting light bearing information from the document between one group of transducers responsive substantially exclusively to said one color and another group of transducers responsive to said different color while being substantially nonresponsive to said one color and alternately conditioning said transducer groups to provide said separate outputs.

10. In the method defined in claim 9, the step of periodically filtering light bearing information from said document to alternately pass to said transducer means light of said one color and said different color.

11. Apparatus for reading a document bearing information printed in one color and containing information entered in a different color, comprising means for optically scanning the document by transducer means that is responsive to both of said colors and control means for alternately conditioning said transducer means to provide separate electrical outputs representative respectively of response to only of one or the other of said colors.

12. Apparatus for the automatic reading of a document bearing printed information in one color and entered information in a different color, comprising means for transporting a document along a fixed path and transducer means for scanning the document in said path adapted to respond to light bearing document information and to provide an electrical output selectively representative of both printed and entered document information, characterized in that the transducer means comprises means alternately conditionable to provide an electrical output representative of only the printed information of said one color sensed by the transducer means and to provide an electrical output representative of said different color sensed by the transducer means, and control means operable to effect said alternate conditioning of said transducer means.

13. Apparatus for automatic document reading according to claim 12, characterized in that said control means comprises a transducer group responsive to instruction marks color printed on the document.

14. Apparatus for automatic document reading according to claim 13, characterized in that said control means further comprises counting means adapted to count a pulse output of said transducer group as derived from each said instruction mark sensed by the latter to determine the alternate conditions of action of said transducer means at predetermined counts.

15. Apparatus for automatic document reading according to claim 12, characterized by optical means operative to split light bearing the information from said document between one group in said transducer means responsive substantially exclusively to said one print color of the document and another group in said transducer means responsive to the different color of said entered information while being substantially nonresponsive to said one color.

16. Apparatus for automatic document reading according to claim 12, characterized by filter means mounted to be displaceable into and out of light bearing the document information from the document to the transducer means under the control means.

17. Apparatus for automatic document reading according to the claim 16, characterized in that said filter means is mounted on the moveable armature of a solenoid in a circuit of said control means.